United States Patent [19]
Maleski

[11] Patent Number: 5,494,298
[45] Date of Patent: Feb. 27, 1996

[54] BROADHEAD FOR AN ARROW AND METHOD OF SECUREMENT

[76] Inventor: Richard Maleski, 4 South St., Plymouth, Conn. 06782

[21] Appl. No.: 173,145

[22] Filed: Dec. 23, 1993

Related U.S. Application Data

[63] Continuation of Ser. No. 939,983, Sep. 3, 1992, abandoned, which is a continuation-in-part of Ser. No. 637,452, Jan. 4, 1991, Pat. No. 5,145,186.

[51] Int. Cl.⁶ ........................................ F42B 6/08
[52] U.S. Cl. ............... 273/422; 30/342; 81/491; 403/341; 403/361; 273/80.1
[58] Field of Search ................ 273/416, 419–423, 273/80.1, 80.7; 30/329, 336–338, 342; 81/492, 491, 489; 29/80; 403/341, 361

[56] References Cited

U.S. PATENT DOCUMENTS

| | | |
|---|---|---|
| D. 310,553 | 9/1990 | Kania et al. . |
| D. 314,416 | 2/1991 | Rezmer . |
| 653,642 | 7/1900 | Darling . |
| 1,002,158 | 8/1911 | Konigsberg et al. ............. 273/80.1 |
| 1,038,834 | 9/1912 | Bloom . |
| 1,160,440 | 11/1915 | Ohl ................................. 403/361 X |
| 1,554,317 | 9/1925 | Worthing ....................... 403/361 X |
| 1,604,713 | 10/1926 | Norlund ............................ 273/421 |
| 1,665,811 | 4/1928 | Hadden ............................. 273/80.1 |
| 2,137,014 | 11/1938 | Brochu . |
| 2,212,345 | 8/1940 | Krieger . |
| 2,308,542 | 1/1943 | Raybould . |
| 2,350,581 | 6/1944 | Boose . |
| 2,820,634 | 1/1958 | Vance . |
| 2,925,278 | 2/1960 | Sweetland . |
| 2,930,620 | 3/1960 | Brooks . |
| 2,940,758 | 6/1960 | Richter . |
| 3,036,395 | 5/1962 | Nelson . |
| 3,401,938 | 9/1968 | Bear . |
| 3,614,103 | 10/1971 | Carroll . |
| 3,741,542 | 6/1973 | Karbo . |
| 3,868,114 | 2/1975 | Groner . |
| 3,897,062 | 7/1975 | Christensen . |
| 3,910,579 | 10/1975 | Sprandel . |
| 3,915,455 | 10/1975 | Savora . |
| 3,923,310 | 12/1975 | Lowy . |
| 4,006,901 | 2/1977 | Simo . |
| 4,036,499 | 7/1977 | Sherwin . |
| 4,093,230 | 6/1978 | Simo . |
| 4,152,086 | 5/1979 | Achenback et al. . |
| 4,166,619 | 9/1979 | Bergmann et al. ................ 273/421 |
| 4,210,330 | 7/1980 | Kosbab ............................ 273/422 |
| 4,234,191 | 11/1980 | Elandson . |
| 4,349,202 | 9/1982 | Scott . |
| 4,381,866 | 5/1983 | Simo . |
| 4,452,460 | 6/1984 | Adams . |
| 4,505,482 | 3/1985 | Martin, Sr. . |
| 4,533,146 | 8/1985 | Schaar . |
| 4,558,868 | 12/1985 | Musacchia . |
| 4,565,377 | 1/1986 | Troncoso, Jr. et al. . |
| 4,570,941 | 2/1986 | Saunders . |
| 4,621,817 | 11/1986 | Musacchia . |
| 4,643,435 | 2/1987 | Musacchia . |
| 4,706,965 | 11/1987 | Schaar . |
| 4,772,029 | 9/1988 | Watkins . |
| 4,781,386 | 11/1988 | Armitage . |
| 4,874,180 | 10/1989 | Fingerson et al. . |
| 4,943,067 | 7/1990 | Saunders . |
| 4,944,520 | 7/1990 | Fingerson et al. . |
| 5,046,744 | 9/1991 | Eddy . |
| 5,145,186 | 9/1992 | Maleski ............................ 273/422 |

FOREIGN PATENT DOCUMENTS

| | | |
|---|---|---|
| 2626187 | 7/1989 | France . |
| 320273 | 10/1929 | United Kingdom ............ 273/80.7 |

OTHER PUBLICATIONS

Archer's Bible 1966–1967, p. 75 Mar. 1967.

*Primary Examiner*—Paul E. Shapiro
*Attorney, Agent, or Firm*—Dilworth & Barrese

[57] ABSTRACT

A broadhead for an arrow having a locking mechanism which insures true alignment of the longitudinal axis of the broadhead with the longitudinal axis of the shaft of the arrow. The shaft is fit within a longitudinal bore in the body of the broadhead and a locking nut engages external threads at an end of the broadhead which tightens the body of the broadhead about the shaft of the arrow to frictionally engage the arrow shaft within the broadhead body.

5 Claims, 6 Drawing Sheets

BROADHEAD FOR AN ARROW AND METHOD OF SECUREMENT

CROSS-REFERENCE TO RELATED APPLICATIONS

This is a continuation, of application Ser. No. 07/939,983 filed on Sep. 3, 1992, now abandoned, which is a continuation-in-part application of application Ser. No. 07/637,452, filed Jan. 4, 1991, now U.S. Pat. No. 5,145,186.

BACKGROUND OF THE INVENTION

1. Field of the Invention

The present invention relates to broadheads for arrows, and more particularly, to a means for securing the broadhead to the shaft of the arrow. A method of securing the broadhead to the shaft of the arrow is also disclosed.

2. Discussion of the Prior Art

Arrows having broadheads secured by various means to the arrow shaft are well known in the art. Means of securement of the broadhead to the arrow shaft typically include a threaded post which extends from the broadhead which is screwed directly into a tapped end of the arrow shaft or a tapped adapter which is generally secured to the shaft by adhesives, which allows the broadhead to be screwed into the adapter to secure it to the shaft.

Various means for securing the broadhead to the arrow have been developed in an effort to provide an aerodynamically balanced arrow which maintains its accuracy during flight. In addition to the tapped post of the broadhead being screwed into an adapter or into the arrow shaft itself, several other means are provided which include adhesives, crimping, or threaded tubes which secure the broadhead to the arrow shaft by screwing the broadhead into one end of the tube while screwing the arrow shaft into the other end.

Typical securement devices incorporating a threaded post on the body of the broadhead which is screwed into an adapter or directly into the arrow shaft itself are disclosed in, for instance, U.S. Pat. No. 2,940,758 to Richter, U.S. Pat. No. 4,452,460 to Adams, U.S. Pat. No. 3,741,542 to Karbo and U.S. Pat. No. 4,036,499 to Sherwin, among others.

Many other prior art arrows provide a hollow end of the arrow shaft which allows for securement of the broadhead to the shaft by crimping the shaft about a post on the broadhead or a separate post to which the broadhead is also mounted. Arrows of this type are disclosed in, for instance, U.S. Pat. No. 4,533,146 to Schaar, U.S. Pat. No. 4,706,965 to Schaar, U.S. Pat. No. 4,772,029 to Watkins, and U.S. Pat. No. 4,943,067 to Saunders.

Prior means for securement of the broadhead to the arrow shaft such as those disclosed above are subject to several disadvantages which primarily affect the performance of the arrow during use. In particular, the use of an adapter member to secure the broadhead to the arrow shaft end subjects the end of the arrow to the additional weight of the adapter member itself as well as the adhesive or glue used to secure the adapter to the shaft. Furthermore, as is a problem with all threaded engagement means such as the threaded post of the broadhead, as well as the threads required on the adapter or the arrow shaft itself, is that the provision of such threads requires precise machining to insure that the broadhead is firmly secured to the arrow shaft for perfect alignment with the longitudinal axis of the shaft. Any deviation of the longitudinal axis of the broadhead from the longitudinal axis of the shaft will consequently result in an arrow which is improperly balanced and aerodynamically incorrect. The accuracy of the flight of the arrow during use will be compromised to a degree which may mean the difference between hitting or missing a target. A further disadvantage to the use of adapter members lies in the fact that the curing time of the adhesive used to secure an adapter to the shaft slows the assembly process by requiring drying time for the adhesive. Furthermore, if the adhesive is not properly applied, the balance of the arrow may be thrown off which will affect its accuracy during flight.

A disadvantage encountered in the arrows having a broadhead crimped to an end of the shaft is also related to the balance and aerodynamic characteristics of the arrow. If the crimping is not uniform, the longitudinal axis of the broadhead may not align with the longitudinal axis of the shaft and therefore provide an unbalanced and aerodynamically incorrect arrow. Furthermore, the end weight of the crimping member results in an arrow whose forward end is overly weighted, and which will affect performance.

The novel broadhead securement means of the present invention obviates the disadvantages encountered in the prior art and provide an efficient means for frictionally and releasably securing the broadhead to an arrow shaft which maintains the balance and aerodynamic performance of the arrow. The means for securing the broadhead to the arrow of the present invention also provides a quicker and more efficient assembling process during manufacture, as well as for replacing the broadhead in the field.

SUMMARY OF THE INVENTION

The present invention provides a novel means for securing a broadhead to an arrow shaft which maintains the balance and aerodynamic properties of the arrow without adding additional weight to the broadhead end of the arrow. The means for securing the broadhead to the arrow shaft reduces the requirement for exact precision machining present in prior art arrows while providing a precise alignment of the longitudinal axis of the broadhead with the longitudinal axis of the arrow shaft.

The means for securing the broadhead to the arrow shaft of the present invention may be used with any arrow, harpoon, spear or similar device requiring a broadhead attachment to the shaft of the projectile. The perfectly aligned and balanced arrow resulting from the means of securement of the present invention maintains the aerodynamic properties of the arrow and insures accuracy in flight.

The securement means of the present invention is utilized with a broadhead which essentially comprises a pointed tip at one end and a longitudinal bore at the other end, and having a plurality of blades on the body portion of the broadhead. The end of the broadhead body at the longitudinal bore is provided with a threaded portion for accepting a locking nut, and preferably at least one axial slot is provided at the threaded portion for tightening purposes.

During assembly, the locking nut is slipped over the arrow shaft and the arrow shaft is then inserted into the longitudinal bore of the broadhead body. As the locking nut is tightened to the threaded portion of the broadhead body, the body is tightened about the shaft by collapsing the body about the shaft at the axial slots. The locking nut is provided with a tapered surface at the entrance to the threads which mates with a tapered portion of the body of the broadhead so that as the nut is tightened the broadhead body is squeezed about the arrow shaft to frictionally secure the shaft within the body. Preferably, at least two axial slots are provided about the threaded portion, so that as the nut is tightened, the body is squeezed about the shaft in a uniform manner to insure that the longitudinal axis of the broadhead is perfectly aligned with the longitudinal axis of the arrow shaft.

In an alternate embodiment, the locking nut may be replaced by a slidable sleeve member which has an inner diameter slightly less than the outer diameter of the end of the broadhead, and is slid over the end of the broadhead to secure the arrow-shaft within the longitudinal bore. The sleeve member may be provided with a cam surface to engage a detent positioned about the end of the broadhead, or the cam surface may be provided on the broadhead end to engage a detent on the inner surface of the sleeve member.

Alternately, a ferrule or ring may be provided as a locking flange about the arrow shaft which is then slid into the longitudinal bore of the body member of the broadhead so that upon tightening of the locking nut the body member is deformed to fit about the ferrule and secure the broadhead to the arrow shaft in a uniform and balanced manner to maintain the alignment of the longitudinal axes of both the broadhead and the shaft. The use of such a ferrule allows for the assembly of an arrow by applying a broadhead to any size shaft having various diameters which still provides for an arrow which is aerodynamically correct and balanced to insure accuracy of flight.

In addition, the securement means may further include means for urging the blades of the broadhead forward to lock the blades in place on the broadhead. Typically, the blades are positioned in grooves on the body of the broadhead and are secured at one end under the pointed tip member and either at the second end or by a ring about the body of the broadhead. However, the blades sometimes exhibit some sliding movement in the grooves although they are still securely affixed to the broadhead. In order to eliminate the sliding movement of the blades, the present invention provides a resilient member which cooperates with the securement means to urge the blades forward towards the tip member. The resilient means preferably comprises an O-ring constructed of any suitable material, such as rubber, plastic; metal or the like.

BRIEF DESCRIPTION OF THE DRAWINGS

The foregoing features of the present invention will become more readily apparent and may be understood by referring to the following detailed description of an illustrative embodiment of the broadhead of the present invention and its novel means for securing the broadhead to the shaft of an arrow, taken in conjunction with the accompanying drawings, in which.

DETAILED DESCRIPTION OF THE PREFERRED EMBODIMENT

Figure 1:
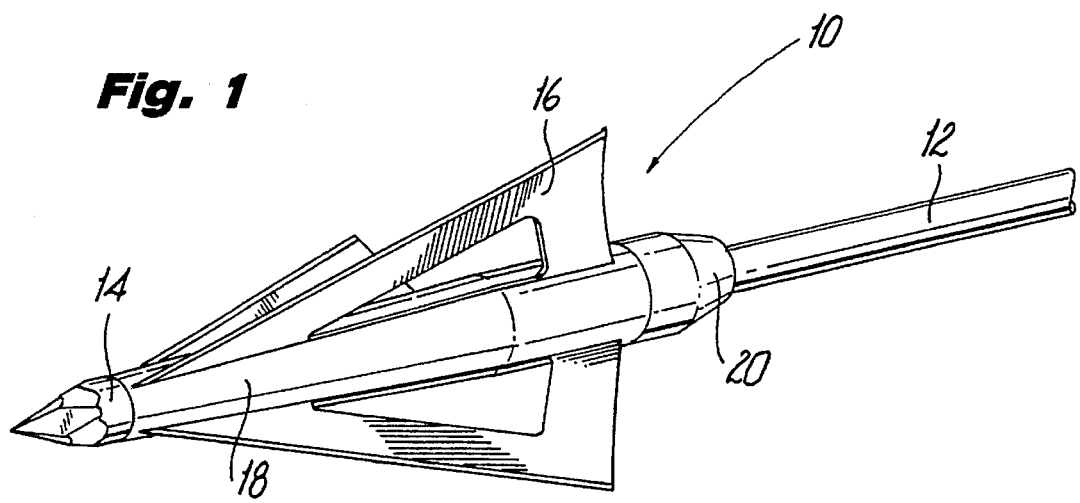
FIG. 1 illustrates a perspective view of an arrow having the broadhead of the present invention secured to a shaft.

Referring now in specific detail to the drawings, in which like reference numerals identify similar or identical elements throughout the several views, FIG. 1 shows the broadhead 10 of the present invention secured to a shaft 12. Broadhead 10 includes a pointed tip 14 at one end which is attached to a body portion 18 along with blades 16. The broadhead 10 is secured by a locking mechanism 20 to the shaft 12 of the arrow.

Figure 2:
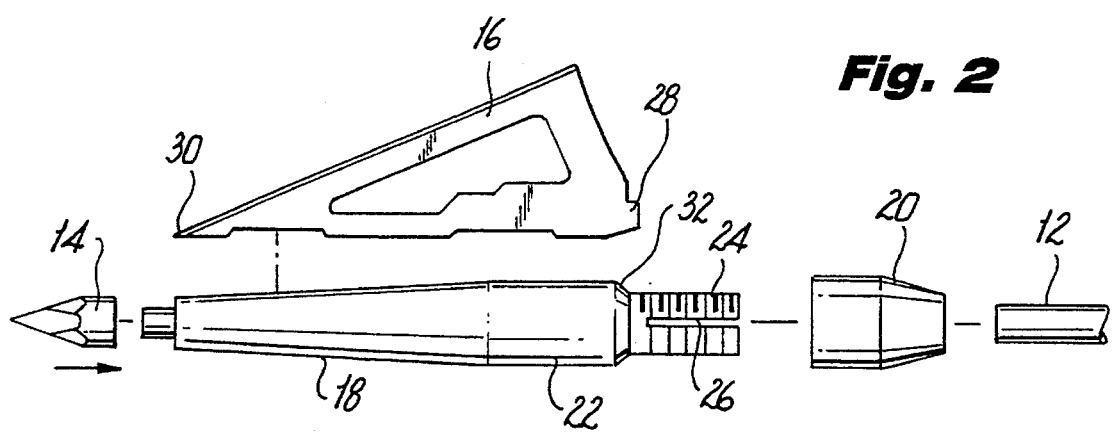
FIG. 2 illustrates a partial exploded view of the broadhead of the present invention having its novel means for securing the broadhead to the shaft of the arrow.
Figure 3:
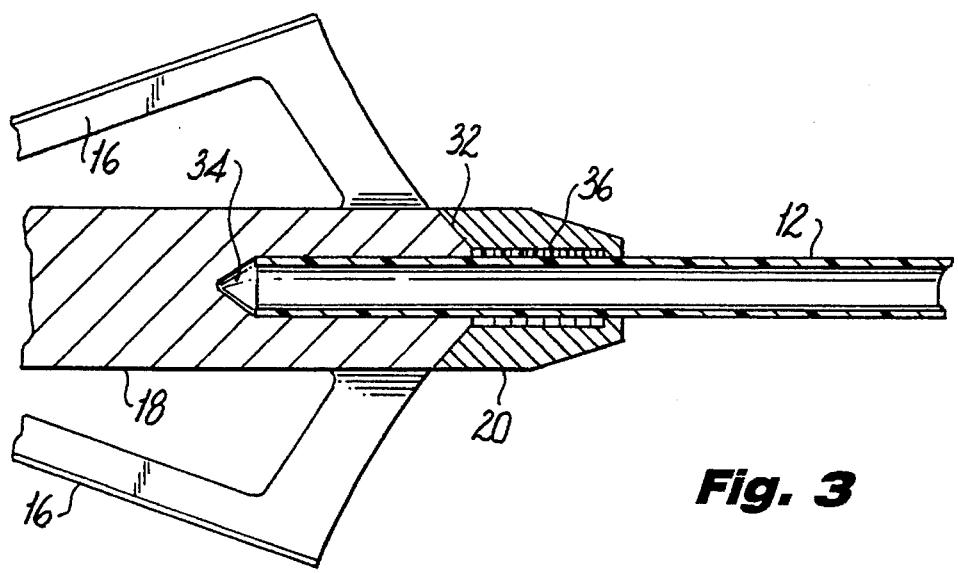
FIG. 3 illustrates a partial cross-sectional view of the assembled broadhead and shaft of the present invention.

FIG. 2 shows the assembly of broadhead 10 to shaft 12, and FIG. 3 shows a cross-section of the fully assembled arrow. As seen in FIGS. 2 and 3, pointed tip 14 is fit onto body member 18 of broadhead 10 so that front edge 30 of blade 16 fits under an edge of pointed tip 14. Blades 16 are secured in slots 22 in body member 18 in a conventional manner. Notch 28 is provided at the rear end of blade 16 for engagement with locking nut 20 to secure blade 16 in the fully assembled broadhead.

As seen in FIG. 3, shaft 12 passes through locking nut 20 into a longitudinal bore 34 of body member 18. As shaft 12 is fit within longitudinal bore 34, locking nut 20 is rotated for engagement with threads 24 of body member 18. Axial slot 26 is provided through threads 24, and preferably a pair of slots 26 which communicate with longitudinal bore 34. As locking member 20 is rotated, the spacing defined by slots 26 is reduced, and body member 18 at threads 24 is squeezed about shaft 12 to frictionally secure shaft 12 within longitudinal bore 34 as best seen at 36 in FIG. 3.

Body member 18 has a larger diameter at the area adjacent blades 16 than at the area of threads 24, and tapered edge 32 is provided between body member 18 and threads 24. A corresponding tapered edge is provided in locking member 20 so that as locking member 20 is tightened about threads 24, the tapered edges meet to further squeeze body member 18 about shaft 12 to frictionally secure the shaft within the body member. Engagement of the ledge 32 with locking member 20 is best seen in FIG. 3.

Figure 4:
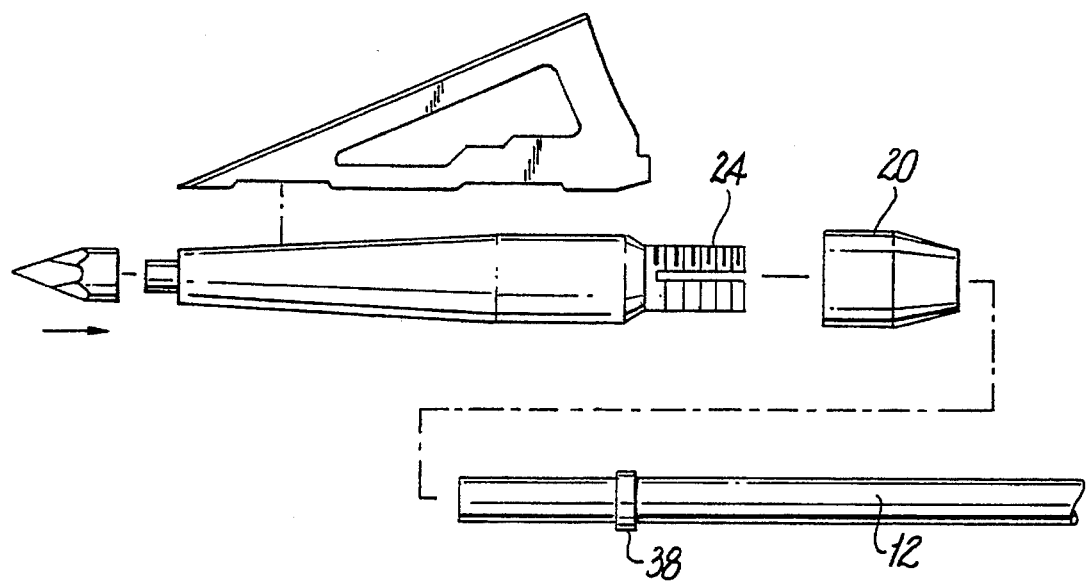
FIG. 4 illustrates a partial exploded view of an alternate embodiment of the present invention.
Figure 5:
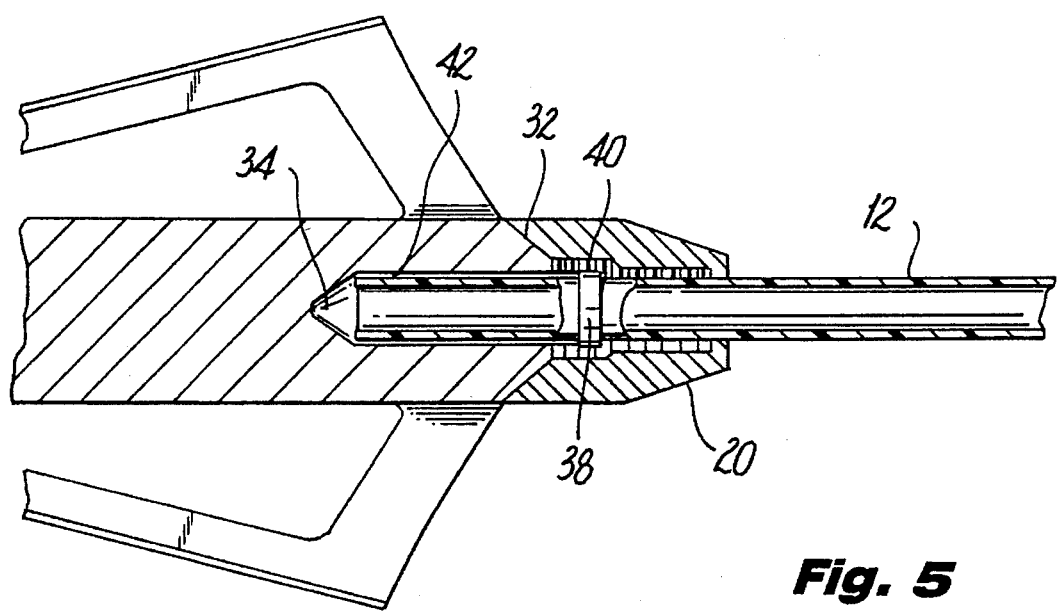
FIG. 5 illustrates a partial cross-sectional view of the broadhead of FIG. 4 showing its securement to the shaft of an arrow.

FIG. 4 illustrates an alternate embodiment of the broadhead securement means in which a shaft having a diameter which is less than a diameter of longitudinal bore 34 may be secured to the broadhead without compromising the alignment of the longitudinal axis of the broadhead with the longitudinal axis of the shaft. The embodiment of FIG. 4 provides a ring or ferrule 38 which is slipped about shaft 12 which approximates the diameter of longitudinal bore 34. As seen in FIG. 5, a space 42 exists between body member 18 and shaft 12 when the shaft is inserted into the broadhead. In use, locking member 20 is slipped over shaft 12 followed by ferrule 38, which may compromise a metallic member or an o-ring constructed of, for instance, a nylon or other hard plastic material. Ferrule 38 may also be provided with a slot which allows for the adjustment of the ferrule about the shaft 12.

Shaft 12 is then slipped into longitudinal bore 34 so that ferrule 38 is inside the bore at threaded portion 24. When locking member 20 is rotated about threads 24, body member 18 deforms about the ferrule 38 as shown at 40 to frictionally lock shaft 12 within body member 18. Tapered edge 32 allows locking member 20 to be tightened securely to insure the alignment of longitudinal axes of the broadhead and the shaft to insure balance and aerodynamic alignment.

Figure 6:
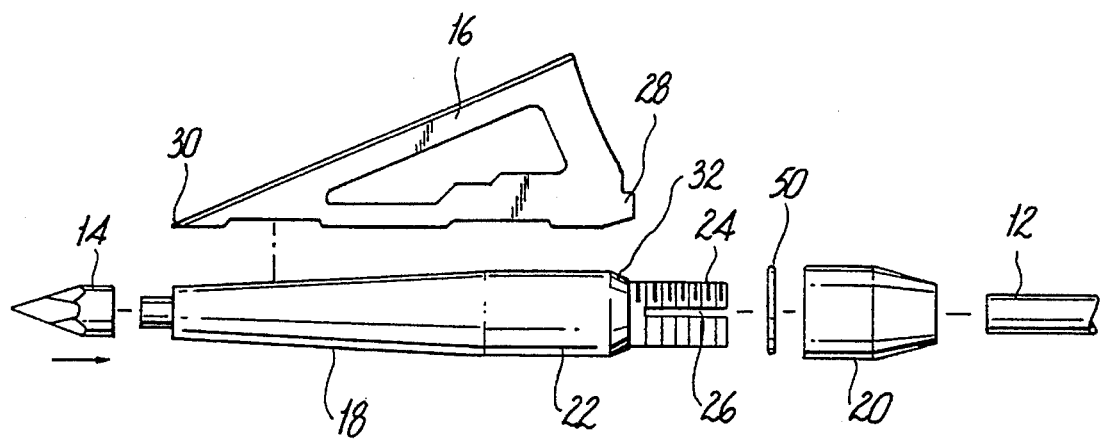
FIG. 6 illustrates a partial exploded view of an alternate embodiment of the broadhead of the present invention.
Figure 7:
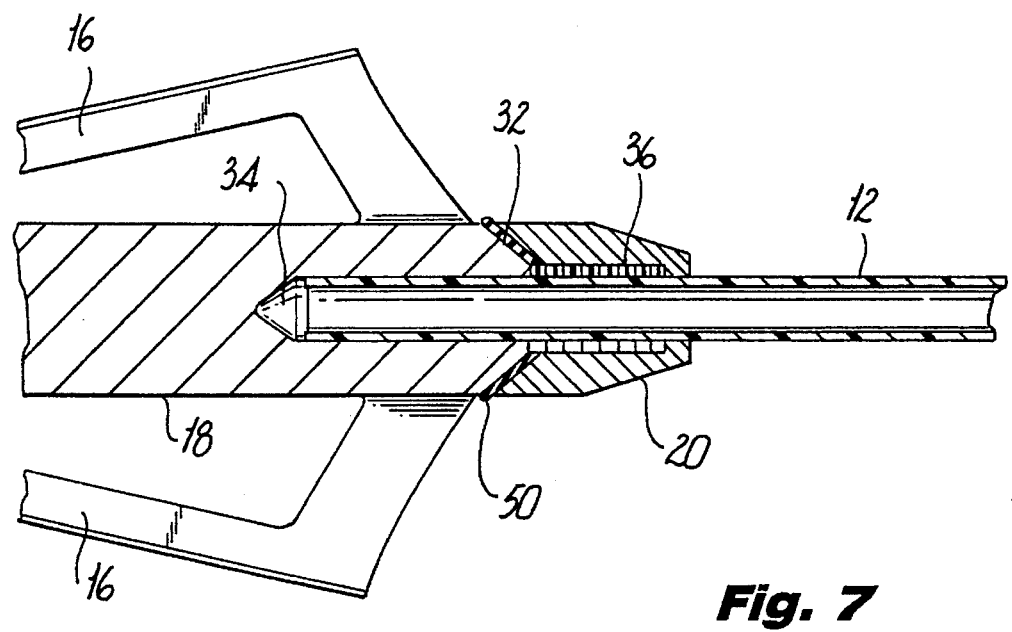
FIG. 7 illustrates a partial cross-sectional view of the broadhead of FIG. 6.

Turning now to FIGS. 6 and 7, there is shown the broadhead of FIG. 1 having means for urging blades 16 forward so that front edge 30 is secured firmly beneath tip 14. Resilient member 50 essentially comprises an O-ring which is slipped over the end of broadhead body 18 and secured between locking member 20 and body 18. Member 50 forces blades 16 forward to eliminate any sliding movement of blades 16 in slots 22.

Figure 8:
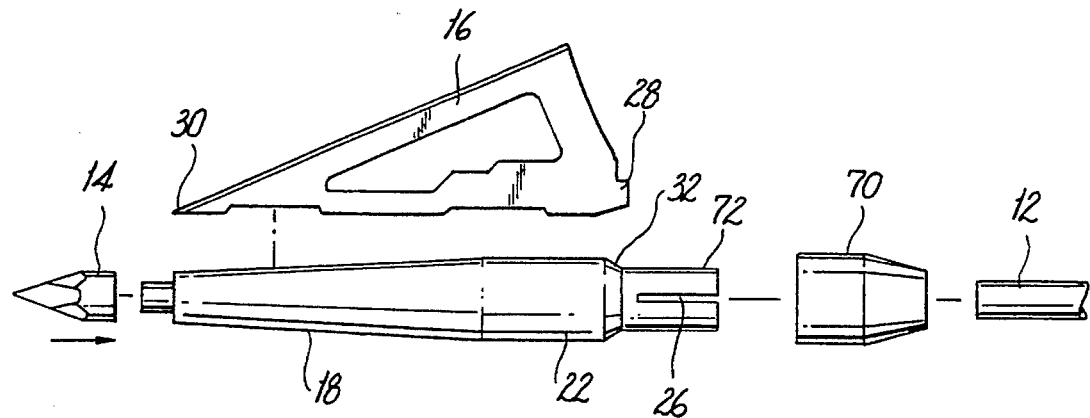
FIG. 8 illustrates a partial exploded view of another embodiment of the present invention.
Figure 9:
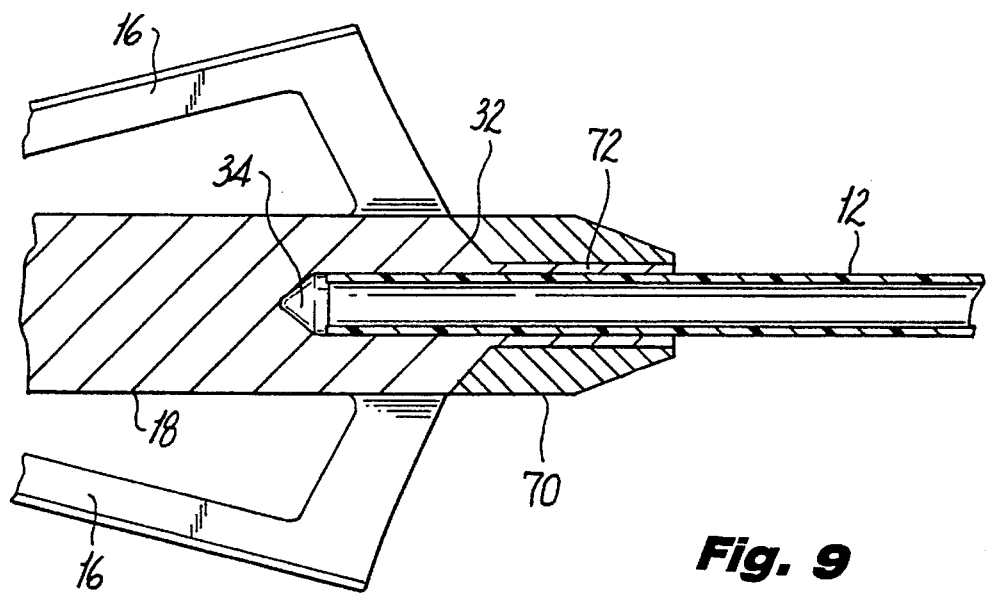
FIG. 9 illustrates a partial cross-sectional view of the broadhead of FIG. 8.

FIGS. 8 and 9 illustrate an alternate means for securing the broadhead to the shaft. Locking nut 20 is replaced by a sleeve member 70 which is provided with an inner diameter which is slightly less than an outer diameter of the end of the broadhead. As sleeve 70 is forced over the end 72 of broadhead body 18, the broadhead frictionally secures shaft 12 within bore 34. Friction maintains sleeve 70 on end 72.

Figure 10:
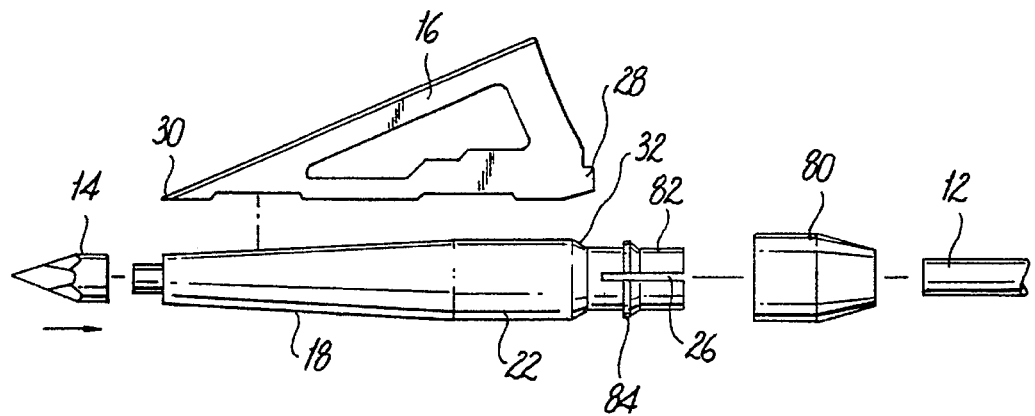
FIG. 10 illustrates a partial exploded view of a further embodiment of the present invention.
Figure 11:
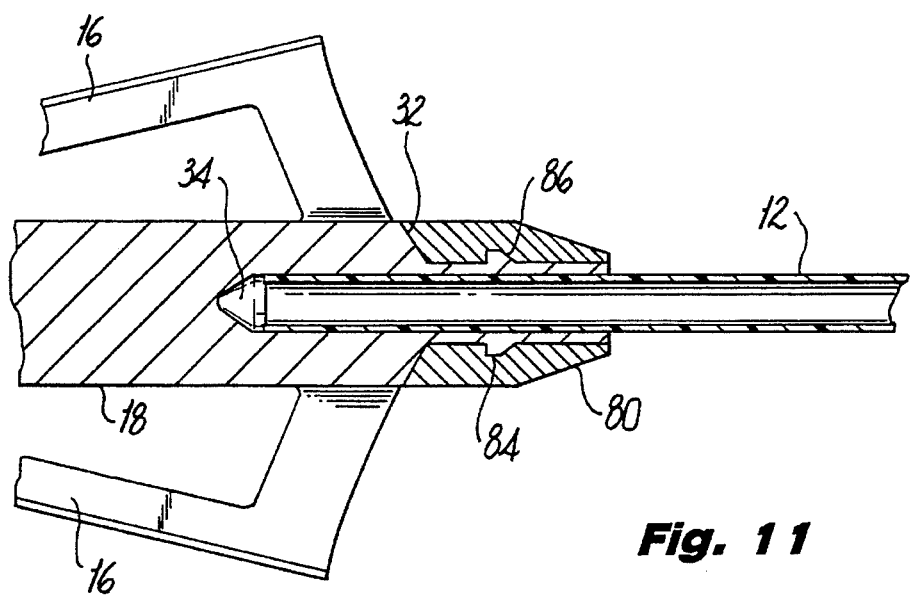
FIG. 11 illustrates a partial cross-sectional view of the broadhead of FIG. 10.

FIGS. 10 and 11 illustrate an alternate locking arrangement in which sleeve member 80 is provided with a cam surface 86 which engages a detent 84 on broadhead end 82. Preferably, detent surface 86 to ride over the detent to lock sleeve member 80 in place to secure shaft 12 within bore 34.

Figure 12:
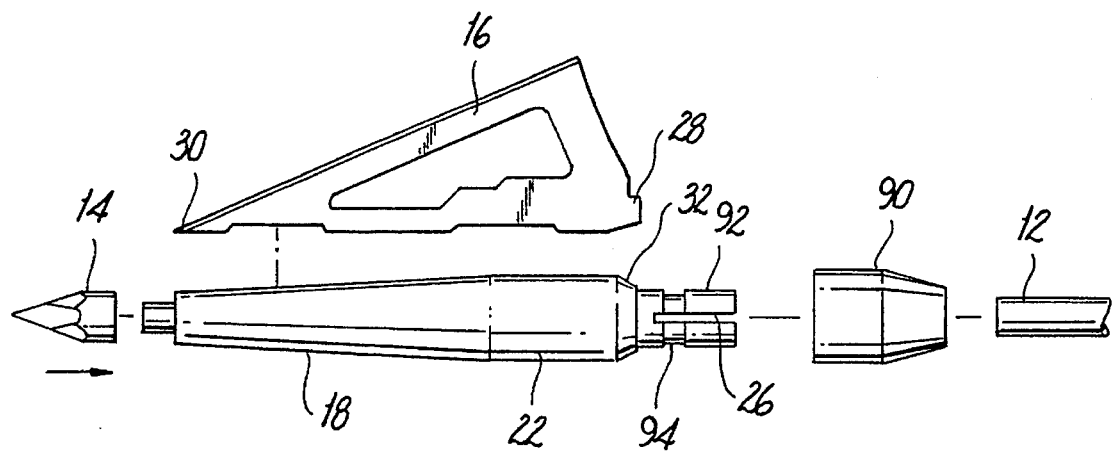
FIG. 12 illustrates a partial exploded view of yet another embodiment of the present invention.
Figure 13:
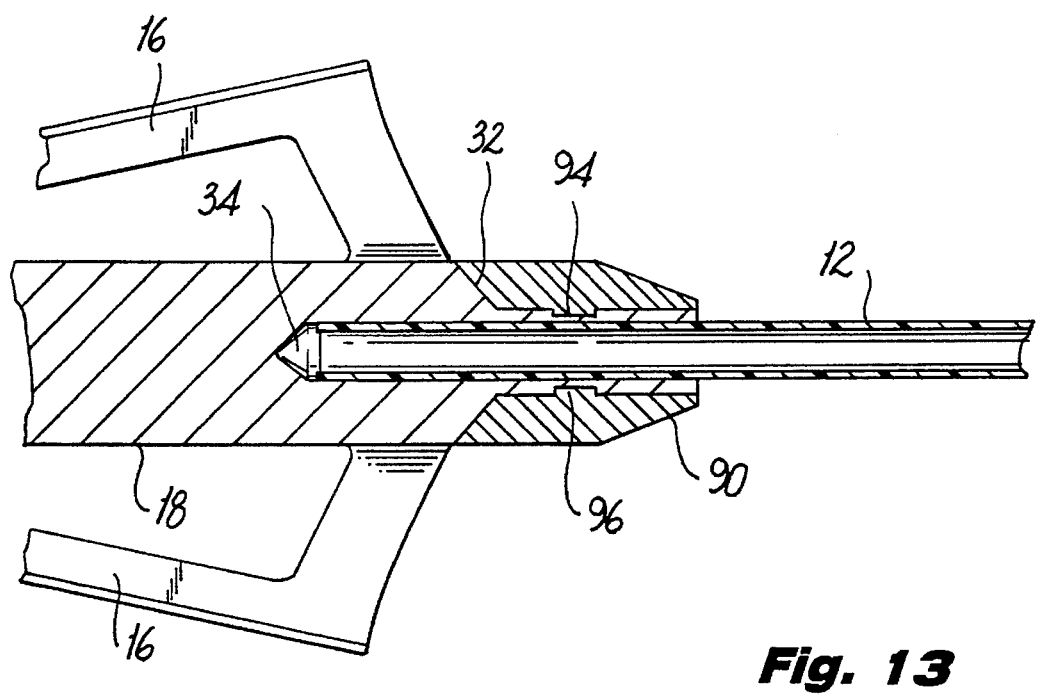
FIG. 13 illustrates a partial cross-sectional view of the broadhead of FIG. 12.

FIGS. 12 and 13 illustrate a locking arrangement similar to FIGS. 10 and 11, except sleeve member 90 includes an internal detent 96 which cooperates with a cam slot 94 on broadhead end 92. As sleeve member 90 is slid over end 92, detent 96 engages cam slot 94 to lock sleeve member 90 in place to secure shaft 12 within bore 34.

While the invention has been particularly shown and described with reference to the preferred embodiments, it will be understood by those skilled in the art that various modifications and changes in form and detail may be made therein without departing from the scope and spirit of the invention. Accordingly, modifications such as those suggested above, but not limited thereto, are to be considered within the scope of the invention.

What is claimed is:

1. An arrow comprising:

a shaft defining a longitudinal axis;

a broadhead including a pointed tip at a first end and a plurality of blades, said broadhead having a longitudinal bore at a second end for accommodating said shaft and at least one longitudinal slot communicating with said bore;

an annular securing collar means removably disposed about said shaft and at least a portion of said second end of said broadhead, said collar means comprising a sleeve having an inner diameter slightly less than an outer diameter of said broadhead at said second end, said sleeve being movable in relation to said second end of said broadhead along said longitudinal axis to effect a radially inwardly directed force on said second end of said broadhead at said bore to deform said broadhead at said slot for frictionally and releasably securing said shaft within said longitudinal bore of said broadhead; and resilient ring means disposed about said second end of said broadhead and positioned between and in contact with said collar means and said blades for urging said blades towards said tip to secure said blades to said broadhead;

wherein said second end of said broadhead includes a detent and said sleeve includes a cam surface cooperating with said detent to secure said shaft within said bore.

2. An arrow according to claim 1, wherein movement of said sleeve to secure said shaft within said bore simultaneously moves said ring means to urge said blades towards said tip.

3. An arrow comprising:

a shaft defining a longitudinal axis;

a broadhead including a pointed tip at a first end and a plurality of blades, said broadhead having a longitudinal bore at a second end for accommodating said shaft and at least one longitudinal slot communicating with said bore;

an annular securing collar means removably disposed about said shaft and at least a portion of said second end of said broadhead, said collar means comprising a sleeve having an inner diameter slightly less than an outer diameter of said broadhead at said second end, said sleeve being movable in relation to said second end of said broadhead along said longitudinal axis to effect a radially inwardly directed force on said second end of said broadhead at said bore to deform said broadhead at said slot for frictionally and releasably securing said shaft within said longitudinal bore of said broadhead; and resilient ring means disposed about said second end of said broadhead and positioned between and in contact with said collar means and said blades for urging said blades towards said tip to secure said blades to said broadhead;

wherein said second end of said broadhead includes a cam surface which cooperates with a detent on an inner surface of said sleeve to secure said shaft within said bore.

4. A broadhead comprising:

a body member defining a longitudinal axis and having a longitudinal bore extending through a portion thereof from a first end thereof for slidably receiving and enclosing an end of an arrow shaft, said body member having at least one axial slot formed therein in communication with said bore and extending from said first end;

a plurality of blade members attached to said body member;

a pointed tip disposed at a second end of said body member opposite said first end; and an annular securing collar comprising a sleeve having an inner diameter slightly less than an outer diameter of said first end of said body member, said sleeve being axially movable in relation to said body member with respect to said longitudinal axis and positionable about said first end of said body member to inwardly radially compress said body member proximate said axial slot to frictionally and releasably secure said end of said arrow shaft within said longitudinal bore;

wherein said first end of said body member includes a detent and said sleeve includes a cam surface cooperating with said detent to secure said shaft within said bore.

5. A broadhead comprising:

a body member defining a longitudinal axis and having a longitudinal bore extending through a portion thereof from a first end thereof for slidably receiving and enclosing an end of an arrow shaft, said body member having at least one axial slot formed therein in communication with said bore and extending from said first end;

a plurality of blade members attached to said body member;

a pointed tip disposed at a second end of said body member opposite said first end; and an annular securing collar comprising a sleeve having an inner diameter slightly less than an outer diameter of said first end of said body member, said sleeve being axially movable in relation to said body member with respect to said longitudinal axis and positionable about said first end of said body member to inwardly radially compress said body member proximate said axial slot to frictionally and releasably secure said end of said arrow shaft within said longitudinal bore;

wherein said first end of said body member includes a cam surface which cooperates with a detent on an inner surface of said sleeve to secure said shaft within said bore.

* * * * *